(12) United States Patent
Aizawa et al.

(10) Patent No.: US 6,434,192 B1
(45) Date of Patent: Aug. 13, 2002

(54) ADAPTIVE EQUALIZING DEVICE

(75) Inventors: Junichi Aizawa, Yokohama; Mitsuru Uesugi, Yokosuka, both of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/188,306

(22) Filed: Nov. 10, 1998

(30) Foreign Application Priority Data

Nov. 13, 1997 (JP) ............................................. 9-329560
Nov. 2, 1998 (JP) .......................................... 10-312415

(51) Int. Cl.$^7$ ................................................. H04B 3/23
(52) U.S. Cl. ...................................... 375/232; 375/231
(58) Field of Search ................................. 375/232, 231; 381/103

(56) References Cited

U.S. PATENT DOCUMENTS 5,420,891 A * 5/1995 Akansu ....................... 375/350
6,252,968 B1 * 6/2001 Narasimhan et al. ........ 381/103

FOREIGN PATENT DOCUMENTS

| JP | 53074815 | 7/1978 | |
| JP | 54096945 | 7/1979 | |
| JP | 54107612 | 8/1979 | |
| JP | 59064932 | 4/1984 | ............ H04B/3/23 |
| JP | 62125722 | 6/1987 | ............ H04B/3/23 |
| JP | 3069216 | 3/1991 | ........... H04B/7/005 |
| JP | 5129890 | 5/1993 | |
| JP | 6508482 | 9/1994 | ............ H04B/3/23 |
| JP | 7504075 | 4/1995 | ............ H04B/3/23 |
| JP | 8046556 | 2/1996 | ............ H04B/3/23 |
| JP | 8079137 | 3/1996 | ............ H04B/3/23 |
| JP | 8213940 | 8/1996 | ............ H04B/3/23 |
| JP | 8307323 | 11/1996 | ............ H04B/3/23 |

OTHER PUBLICATIONS

An English Language abstract of JP 53-074815.
An English Language abstract of JP 54-096945.
An English Language abstract of JP 54-107612.
An English Language abstract of JP 59-064932.
An English Language abstract of JP 62-125722.
An English Language abstract of JP 3-069216.
An English Language abstract of JP 8-046556.
An English Language abstract of JP 8-079137.
An English Language abstract of JP 8-213940.
An English Language abstract of JP 8-307323.
An English Language abstract of JP 7-504075(WIPO).
An English Language abstract of JP 6-508482(WIPO).

* cited by examiner

Primary Examiner—Chi Pham
Assistant Examiner—Dung X. Nguyen
(74) Attorney, Agent, or Firm—Greenblum & Bernstein, P.L.C.

(57) ABSTRACT

Analysis filter splits an input signal into M frequency bands. Sampling rate converter 102 downsamples split signals at a sampling rate of 1/M times. Training processing section 105 receives a known training signal and provides the training processing to the signal for the distortion correction. Sampling rate converter 103 upsamples a corrected signal. Synthesis filter 104 reconstructs upsampled signals into an original signal.

5 Claims, 10 Drawing Sheets

ADAPTIVE EQUALIZING DEVICE

BACKGROUND OF THE INVENTION

1. Field of the Invention

The present invention relates to an adaptive equalizing device used in a mobile communication.

2. Description of the Related Art

With the progress of communication technologies, a high speed data transmission has been required in the mobile communication. In a radio communication where a data transfer rate is more than several Mbps, multipath propagation generates, resulting in a deterioration of a communication quality. To prevent the deterioration, an adaptive equalizer is provided in a radio transmission/reception apparatus.

FIG. 1 is used to explain a configuration of a conventional filter bank used in an adaptive equalizer. The filter bank is primarily composed of a splitting section for splitting an input signal into M frequency bands and a synthesizing section for rearranging split signals to reconstruct an original signal.

The splitting section is composed of analysis filter 1 and sampling rate converter 2. Analysis filter 1 is composed of M analysis filters Hi (z) with different filter coefficients to split the input signal into M frequency bands. A split signal is downsampled at a sampling rate of 1/M times in sampling rate converter 2 provided behind each analysis filter 1.

The signal is upsampled at a sampling rate of M times in sampling rate converter 3, then reconstructed into the original signal by synthesis filter 4. This synthesis filter 4 is composed of M analysis filters Gi(z) with different filter coefficients.

The input signal is split into M frequency bands by the analysis filter 1 and sampling rate converter 2 and will be output ideally as showed in FIG. 2.

However, since the above-mentioned conventional filter bank can not reconstruct split signals properly when a distortion generates in split signals, there is a problem that the conventional filter bank is not applicable to the mobile communication in which a fading distortion and so on occur.

SUMMARY OF THE INVENTION

It is an object of the present invention to provide an adaptive equalizing device capable of compensating a distortion fraction of each band split signal and of reconstructing split signals properly by a filter bank.

The object is achieved by the adaptive equalizing device capable of performing training processing based on a known training signal received in advance to obtain a distortion degree of a signal, compensating the distortion fraction of the signal, and reconstructing the split signals properly by the filter bank.

DETAILED DESCRIPTION OF THE PREFERRED EMBODIMENTS

The adaptive equalizing device of the present invention comprises a filter bank for splitting an input signal into a plurality of frequency bands and synthesizing the split signals to reconstruct, also comprises a training processing section provided in the filter bank for processing a training processing based on a known training signal received in advance, and compensates a distortion fraction of the input signal to reconstruct. According to the constitution, it is possible to compensate the distortion fraction of the signal and reconstruct the signals split by filter banks properly.

In addition, the adaptive equalizing device comprises the filter bank for splitting a received signal into a plurality of frequency bands to synthesize, reconstruct and output, also comprises the equalizing processing section provided in the filter bank for performing the equalizing processing based on the known training signal received in advance, and compensates the distortion fraction of the received signal to reconstruct and output.

According to the constitution, it is possible to make the convergence speed faster by using the filter bank in the adaptive equalizer, while compensating the distortion fraction of the received signal and reconstructing the signals split by the filter bank properly.

Hereinafter, the adaptive equalizing device according to the present invention is explained in detail with reference to attached drawings.

First Embodiment

Figure 1:
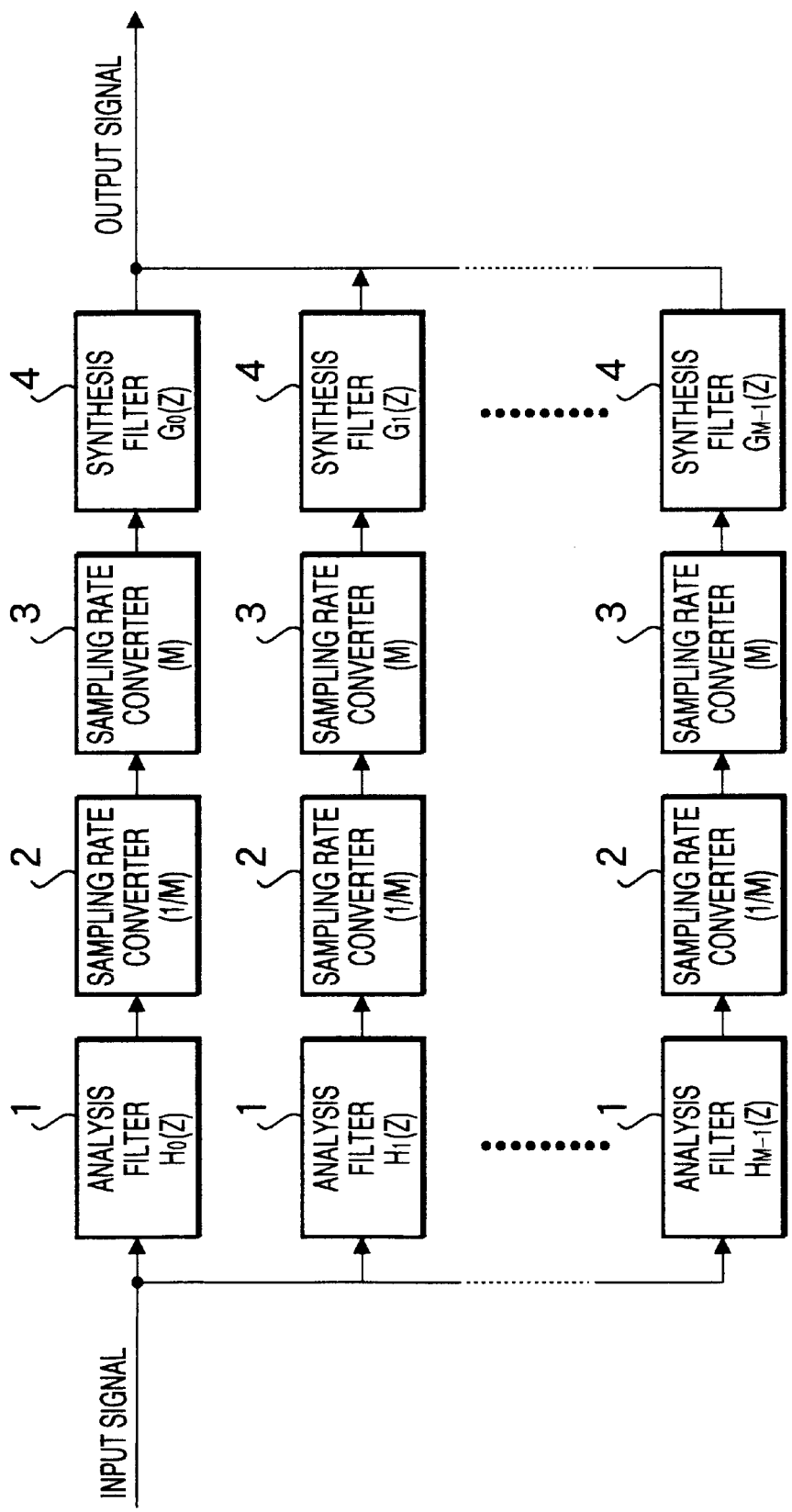
FIG. 1 is a block diagram illustrating a conventional filter bank.
Figure 2:
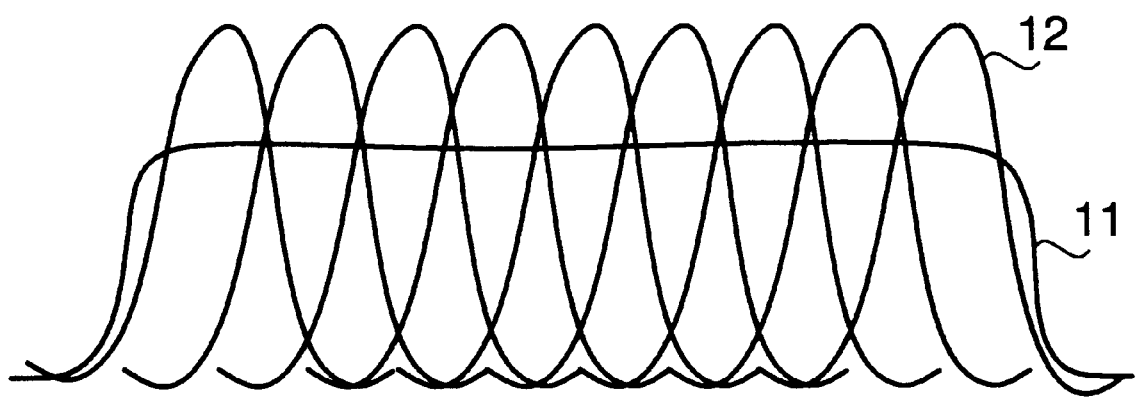
FIG. 2 is a diagram illustrating ideal waveforms of band split signals in the conventional filter bank.
Figure 3:
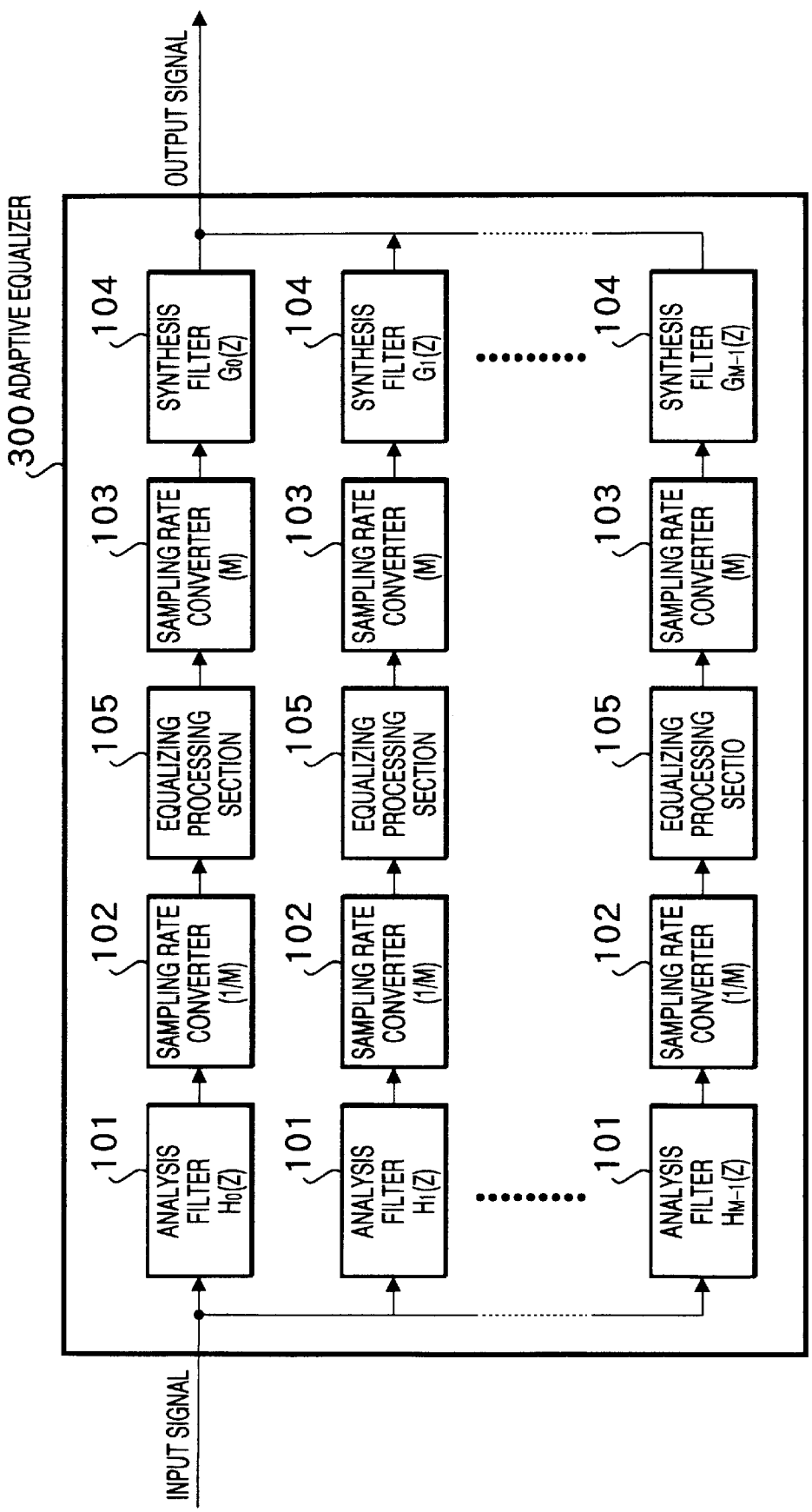
FIG. 3 is a block diagram illustrating a configuration of an adaptive equalizing device according to the present invention.

FIG. 3 is a block diagram illustrating a configuration of the adaptive equalizing device according to the present invention. In FIG. 3, the adaptive equalizing device is primarily composed of a splitting section for splitting the input signal into M frequency bands, a synthesizing section for rearranging split signals to reconstruct an original signal and the equalizing processing section.

The splitting section is composed of analysis filter 101 and sampling rate converter 102. Analysis filter 101 is composed of M analysis filters Hi(z) with different filter coefficients to split the input signal into M frequency bands. The number of splits is set properly according to the convergence speed, filter property and computation complexity, which will be described later.

Figure 4:
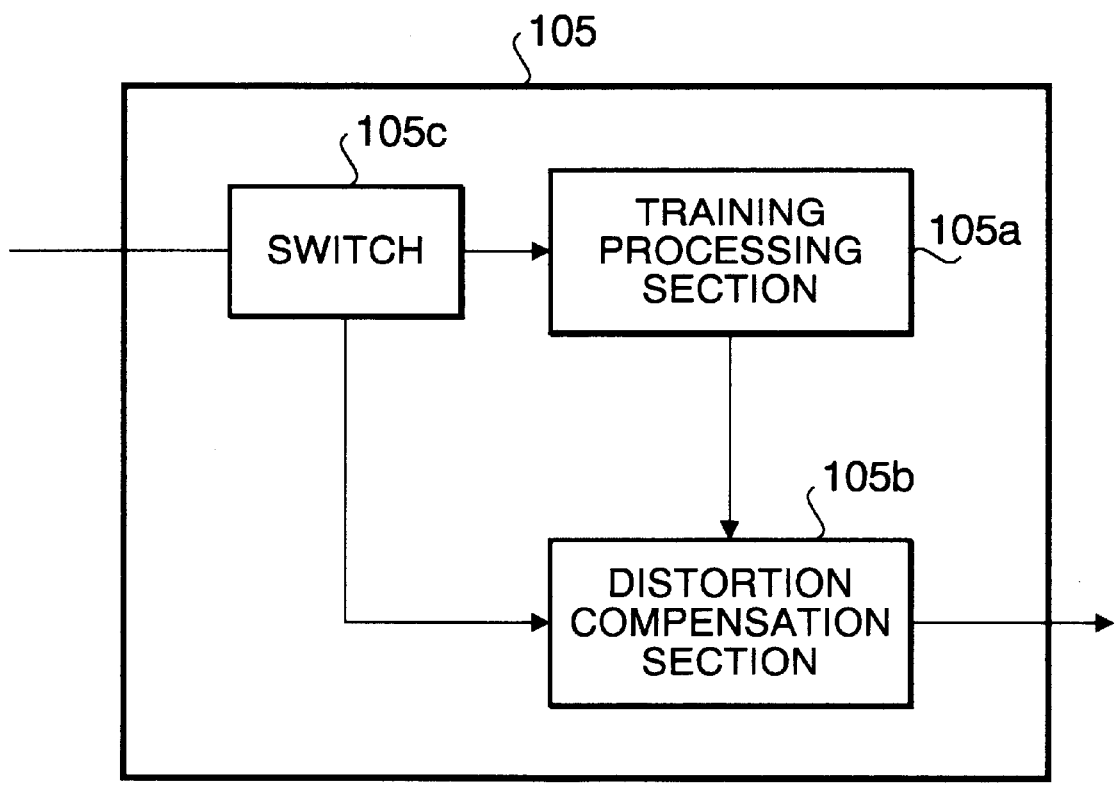
FIG. 4 is a block diagram illustrating a configuration of an equalizing processing section in the adaptive equalizing device illustrated in FIG. 3.

The split signal is downsampled at a sampling rate of 1/M times in sampling rate converter 102 provided behind each analysis filter 101. The signal is upsampled at a sampling rate of M times in sampling rate converter 103, then reconstructed into the original signal by synthesis filter 104. This synthesis filter 104 is composed of M analysis filters Gi(z) with different filter coefficients The adaptive equalizing device comprises equalizing processing section 105 between sampling rate converter 102 for downsampling and sampling rate converter 103 for upsampling. As illustrated in FIG. 4, equalizing processing section 105 includes training processing section 105a for estimating a distortion degree of a signal in a line, distortion compensating section 105b for compensating the distortion of the signal base on a training result, switch 105c for switching a destination between training processing section 105a and distortion compensating section 105b.

The explanation below illustrates the operation of the adaptive equalizing device configured as described above. A training signal included in signals that are split by analysis filter 101 and downsampled is transmitted to training processing section 105a in equalizing processing section 105 and provided the training processing. In detail, this training processing section 105a compares a received training signal with a known training signal and calculates the distortion of the received signal in each frequency band to estimate. The training result, i.e., the comparison information between the received training signal and the known training signal is transmitted to distortion compensating section 105b.

Figure 5:
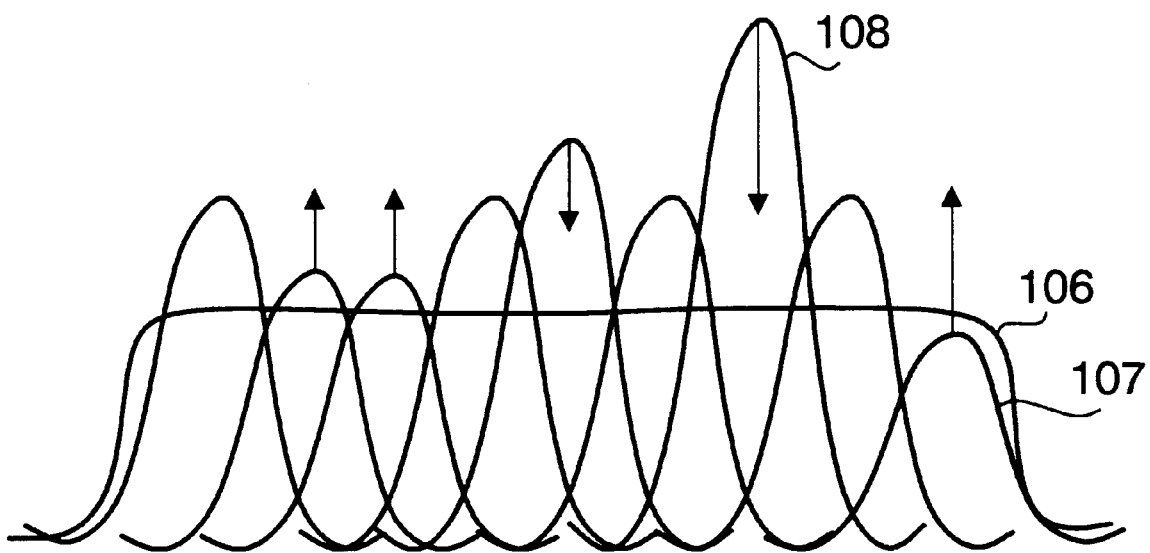
FIG. 5 is a diagram illustrating waveforms to explain an operation of the equalizing processing section illustrated in FIG. 4.

This distortion compensation section 105b performs a signal level correction, as illustrated in FIG. 5, with respect to each of M frequency band split signals having fading distortion and so on output from sampling rate converter 102. That is, a signal 107 level that is lower than a known training signal 106 level is increased, and a signal 108 level that is higher than the known training signal 106 level is decreased. Thus, the correction processing shown by an arrow in the figure is provided to a signal with. level variation, thereby resulting in M signals with almost equal levels.

Distortion compensating section 105b compensates the distortion of the input signal based on the comparison information from training processing section 105a. That is, since the degree of the distortion caused in the line is detected by the training processing, the compensation is provided according to the detected degree of the distortion.

The equalizing processed signal is upsampled at the sampling rate of M times by sampling rate converter 103, and reconstructed to the original signal by synthesis filter 104.

Thus, the received signal is split into a plurality of frequency bands by analysis filter 101, processed for a distortion correction in equalizing processing section 105, and reconstructed into the original signal by synthesis filter 104, thereby reducing the convergence speed of the equalizing processing in the adaptive equalizing device. It is because that the processing speed is increased by decreasing the information amount of each signal and the number of taps in the adaptive equalizing device is decreased, which is achieved by splitting the signal into a plurality of frequency bands by analysis filter 101 and decreasing the sampling rate of each signal of the split frequency band in sampling rate converter 102 for downsampling, as compared to apply a signal of a large frequency band for the convergence in the adaptive equalizing device that results in following complicated line movement.

Figure 6:
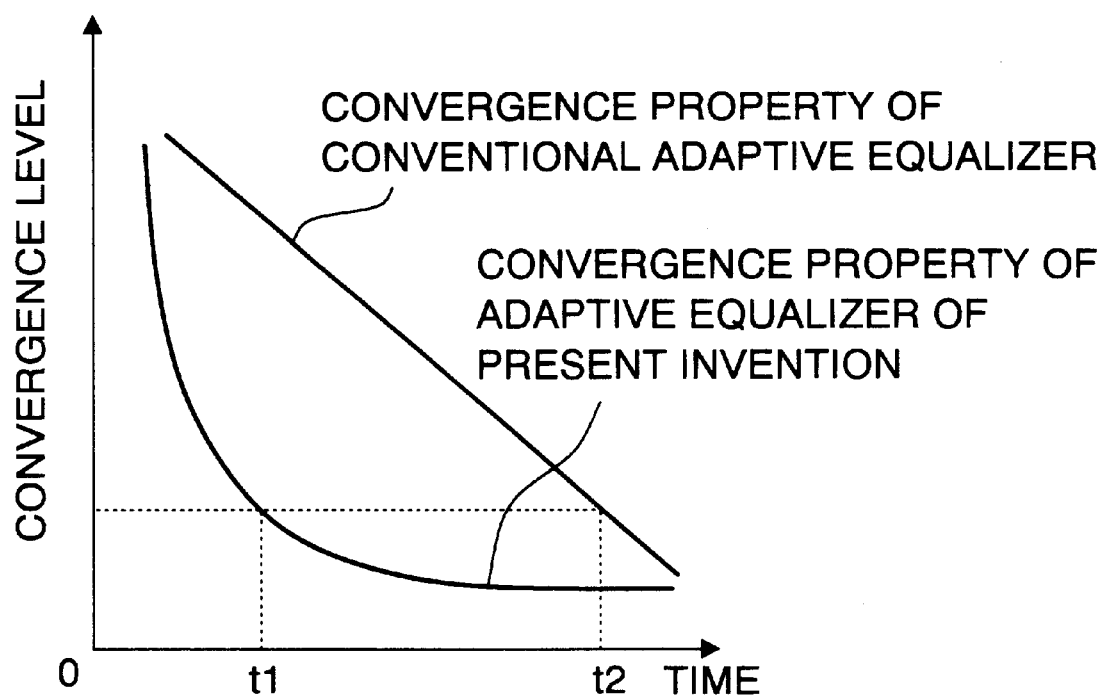
FIG. 6 is a diagram illustrating the convergence speed of the adaptive equalizing device according to the present invention.

The convergence property of the adaptive equalizing device is illustrated in FIG. 6. As found from FIG. 6, the equalizing device of the present invention requires the convergence time t1, while the conventional equalizing device requires the convergence time t2.

Figure 7A:
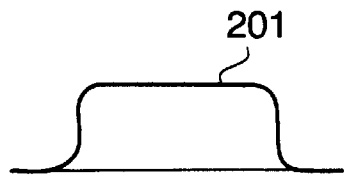
FIG. 7A, FIG. 7B and FIG. 7D are diagrams to explain properties of analysis filters.
Figure 7B:
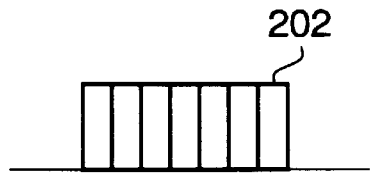
Figure 7C:
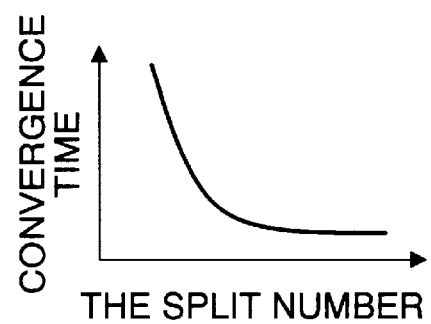
FIG. 7C and FIG. 7E are diagrams illustrating the relation of the convergence time to the number of split frequency bands.
Figure 7D:
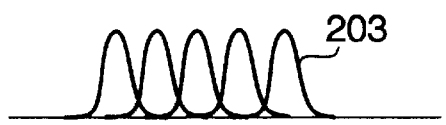
Figure 7E:
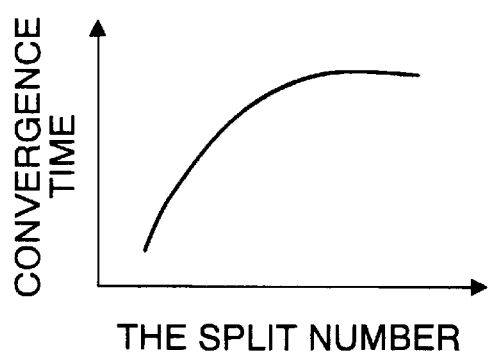

In addition, in the present invention, the number of splits in the case of the frequency band splitting depends on the property of analysis filter 101. In the case of using a filter with relative fine property that splits signal 201 illustrated in FIG. 7A into signal 202 illustrated in FIG. 7B, as illustrated in FIG. 7C, the more the number of splits increases, the shorter the convergence speed of the adaptive equalizing device becomes. In this case, the processing computation is relatively increased. On the other hand, in the case of using a filter with relative poor property that splits signal 201 illustrated in FIG. 7A into signal 203 illustrated in FIG. 7D, as illustrated in FIG. 7E, the more the number of splits increases, the longer the convergence speed of the adaptive equalizing device becomes. Accordingly it is preferable to decide the number of split frequency bands by considering the filter property as described above.

Second Embodiment

Figure 8:
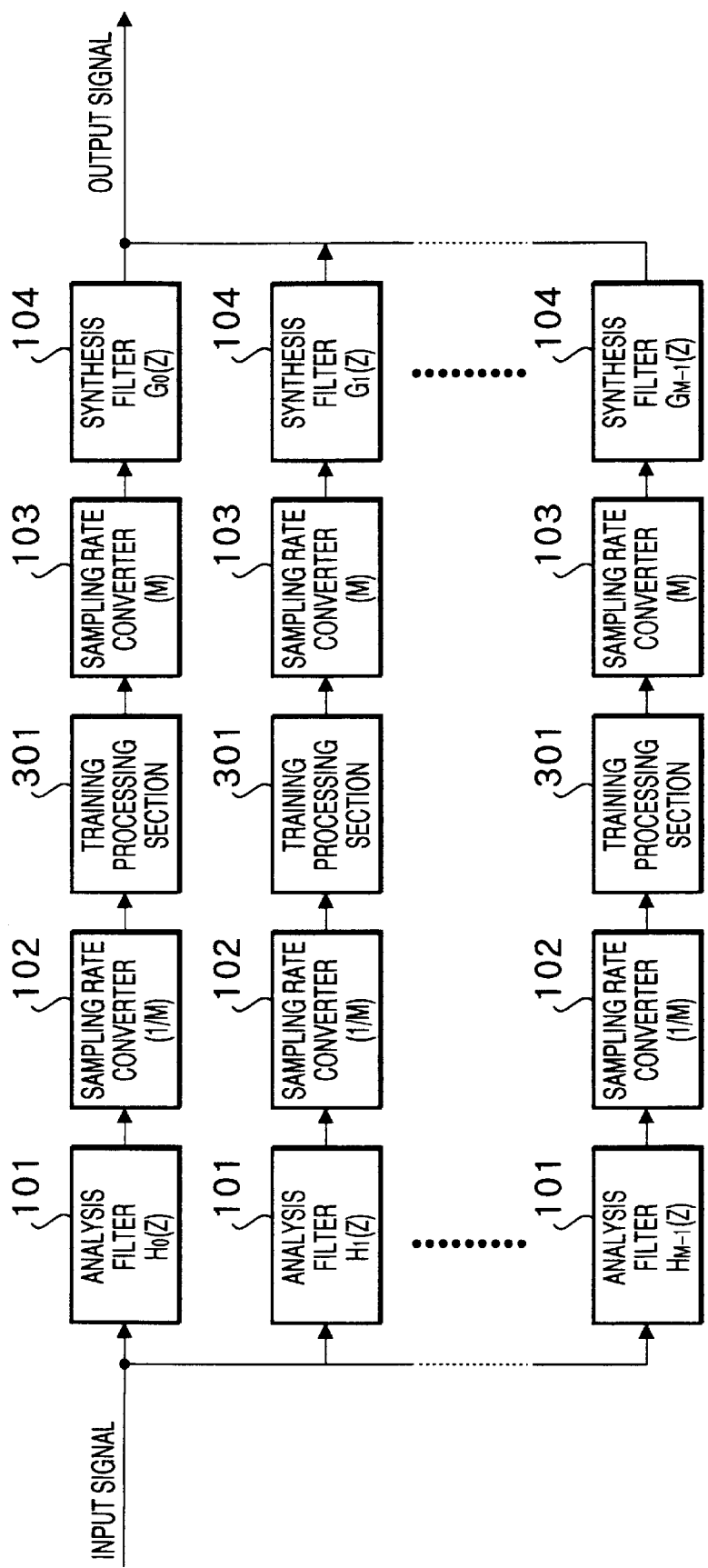
FIG. 8 is a block diagram illustrating a configuration of the filter bank according to the present invention.

The technology of the present invention is applicable to a filter bank including a plurality of processing lines, as illustrated in FIG. 8, composed of analysis filter 101, sampling rate converter 102, training processing section 301, sampling rate converter 103 and synthesis filter 104.

Training processing section 301 provides the training processing to each of M frequency band split signals having fading distortion and so on output from sampling rate converter 102, thus resulting in the signal level correction as illustrated in FIG. 5.

In the processing in this embodiment, the distortion correction to the input signal is performed using the distortion information in the line obtained by providing the training processing to the known signal. The distortion correction is performed in detail, as illustrated in FIG. 5, to increase the signal 107 level that is lower than the known training signal 106 level and to decrease the signal 108 level that is higher than the training signal 106 level.

The distortion corrected signal is upsampled at the sampling rate of M times in sampling rate converter 103, then reconstructed into the original signal in synthesis filter 104.

Thus, by receiving the known training signal in advance to perform the training processing, it is possible to compensate the distortion fraction of the received signal and reconstruct the transmitted original signal properly.

Third Embodiment

Figure 9:
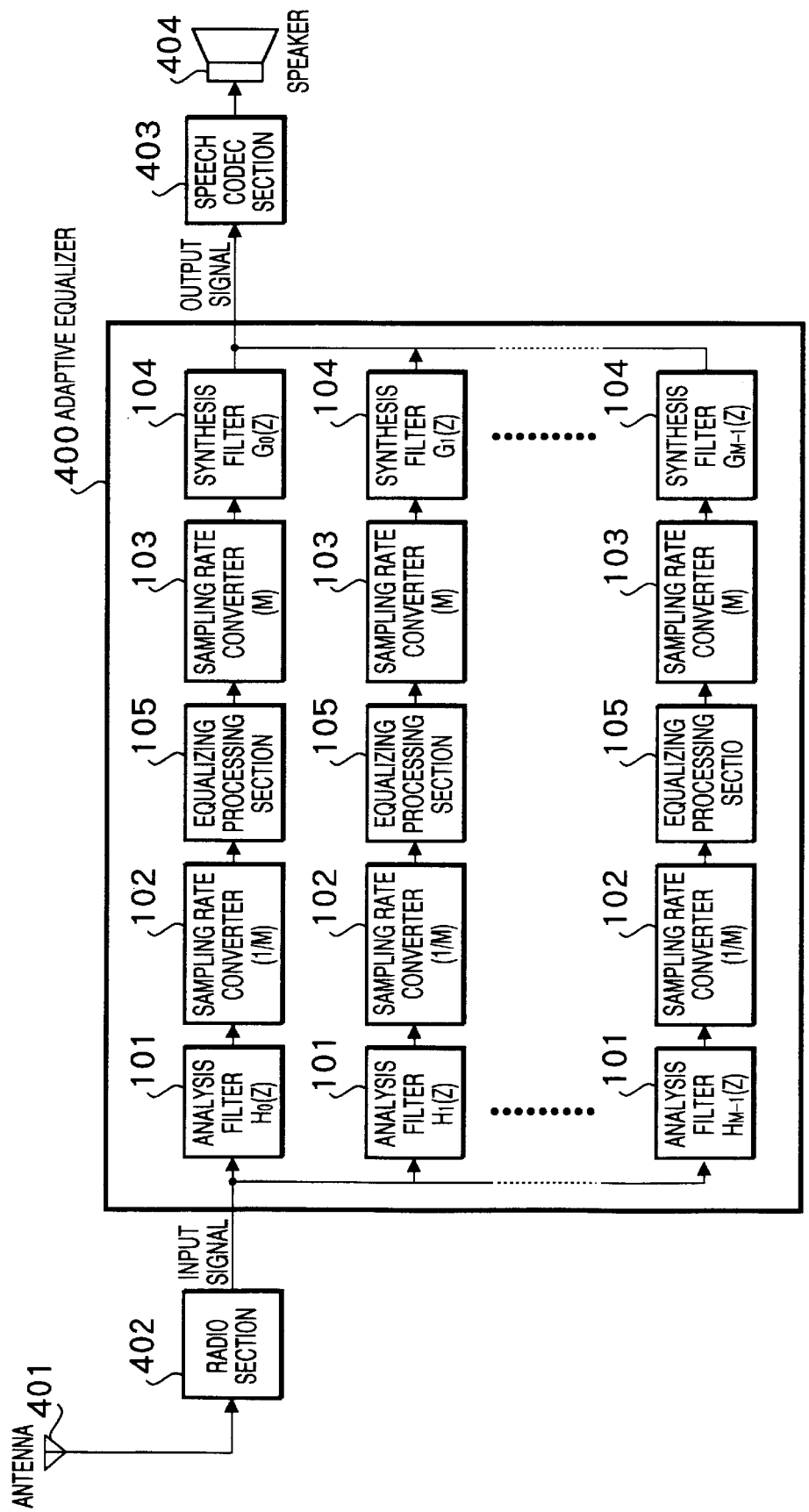
FIG. 9 is a block diagram illustrating a configuration of a communication terminal apparatus comprising the adaptive equalizing device according to the present invention.

FIG. 9 is a block diagram illustrating a configuration of a mobile communication terminal apparatus comprising the adaptive equalizing device according to the present invention. In FIG. 9, the same sections as in FIG. 3 are assigned the same symbols to omit the explanation.

In FIG. 9, a radio wave received at antenna 401 is received in radio section 402, and the received signal is processed in adaptive equalizing device 400 as described above. That is, in the adaptive equalizing device, analysis filter 101 splits the received signal into a plurality of frequency bands, equalizing processing section 105 provides the distortion correction to the split signals, and synthesis filter 104 reconstructs the resultant into the original signal. Thus, the convergence time of the equalizing processing in the adaptive equalizing device is reduced. It is because that the processing speed is increased by decreasing the information amount of each signal and the number of taps in the adaptive equalizing device is decreased, which is achieved by decreasing the sampling rate of each signal of the frequency band to process, as compared to apply a signal of a large frequency band for the convergence in the adaptive equalizing device that results in following complicated line movement.

An output signal from adaptive equalizing device 400 is speech decoded in speech codec section 403 and output as a speech from speaker 404.

Fourth Embodiment

Figure 10:
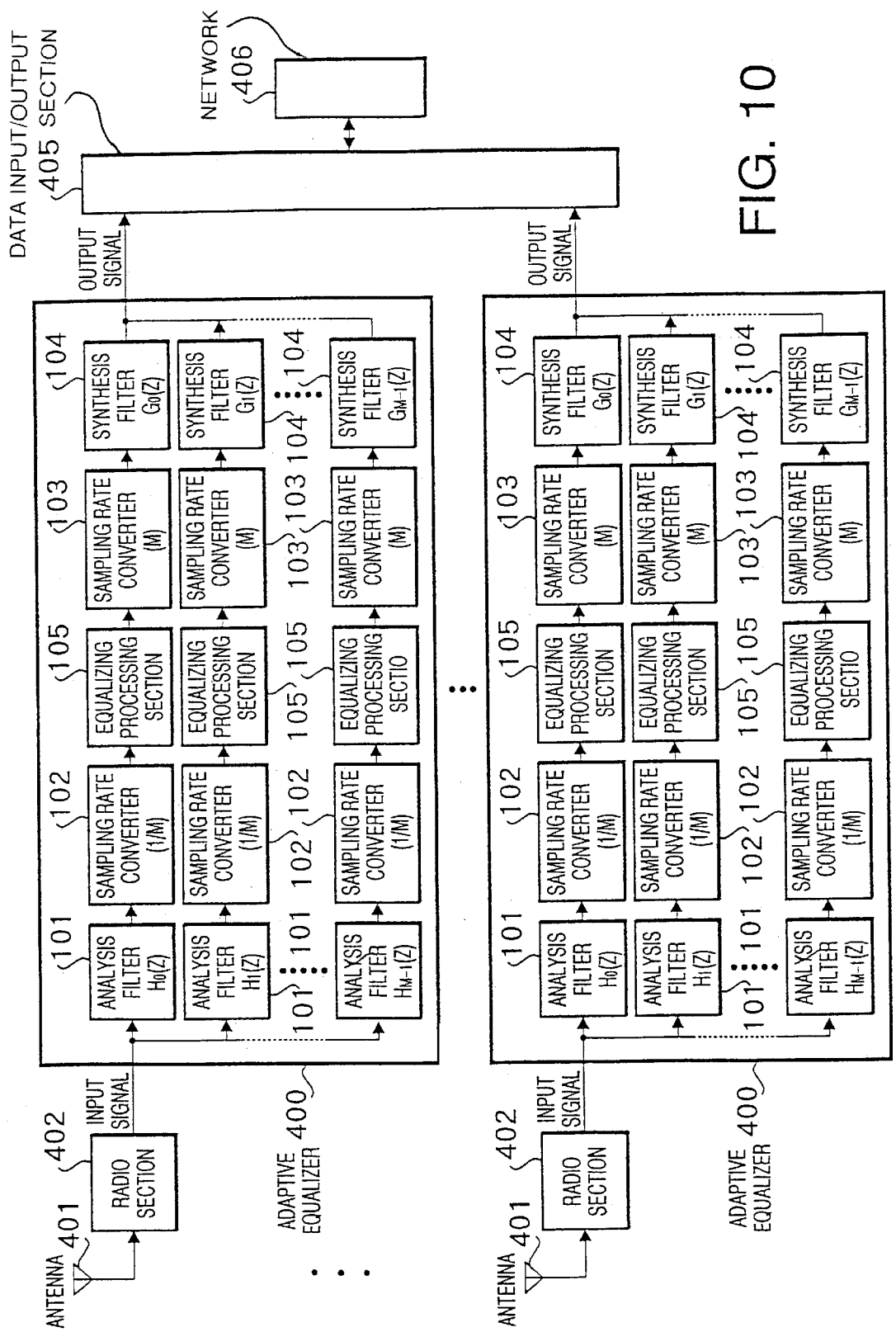
FIG. 10 is a block diagram illustrating a configuration of a base station apparatus comprising the adaptive equalizing device according to the present invention.

FIG. 10 is a block diagram illustrating a configuration of a mobile communication base station apparatus comprising the adaptive equalizing device according to the present invention. In FIG. 10, the same sections as in FIG. 3 are assigned the same symbols to omit the explanation.

In FIG. 10, a radio wave received at antenna 401 is received in radio section 402, and the received signal is processed in adaptive equalizing device 400 as described above. That is, in the adaptive equalizing device, analysis filter 101 splits the received signal into a plurality of frequency bands, equalizing processing section 105 provides the distortion correction to the split signals, and synthesis filter 104 reconstructs the resultant into the original signal. Thus, the convergence time of the equalizing processing in the adaptive equalizing device is reduced. It is because that the processing speed is increased by decreasing the information amount of each signal and the number of taps in the adaptive equalizing device is decreased, which is achieved by decreasing the sampling rate of each signal of the frequency band to process, as compared to apply a signal of a large frequency band for the convergence in the adaptive equalizing device that results in following complicated line movement.

An output signal from adaptive equalizing device 400 is transmitted to network 406 via data input/output section 405.

As described above, in the adaptive equalizing device of the present invention, it is possible to compensate the distortion fraction of each signal of split frequency band and to reconstruct the split signals properly and quickly.

In addition, by applying the adaptive equalizing device to a radio transmission/reception apparatus, mobile communication terminal apparatus and mobile communication base station apparatus, it is possible to obtain appropriate reconstructed signals and the fast convergence speed in each apparatus.

What is claimed is:

1. An adaptive equalizing device comprising:
   a splitter that splits an input signal into a plurality of split signals of a plurality of frequency bands;
   a training system that provides training processing based on a training signal included in downsampled split signals that have been downsampled after being split;
   a distortion compensating system that provides distortion compensation to each of said downsampled split signals based on a result of said training processing; and
   a synthesizing system that synthesizes distortion-compensated signals that have been subjected to said distortion compensation and are then upsampled.

2. A communication terminal apparatus having an adaptive equalizing device, said adaptive equalizing device comprising:
   a splitter that splits an input signal into signals of a plurality of frequency bands;
   a training system that provides training processing based on a training signal included in downsampled split signals that have been downsampled after being split;
   a distortion compensating system that provides distortion compensation to each of said downsampled split signals based on a result of said training processing; and
   a synthesizing system that synthesizes distortion-compensated signals that have been subjected to said distortion compensation and are then upsampled.

3. A base station having an adaptive equalizing device, said adaptive equalizing device comprising:
   a splitter that splits an input signal into signals of a plurality of frequency bands;
   a training system that provides training processing based on a training signal included in downsampled split signals that have been downsampled after being split;
   a distortion compensating system that provides distortion compensation to each of said downsampled split signals based on a result of said training processing; and
   a synthesizing system that synthesizes distortion-compensated signals that have been subjected to said distortion compensation and are then upsampled.

4. A filter bank comprising:
   a splitter that splits an input signal into signals of a plurality of frequency bands;
   a training system that provides training processing based on a training signal included in downsampled split signals that have been downsampled after being split;
   a distortion compensating system that provides distortion compensation to each of said downsampled split signals based on a result of said training processing; and
   a synthesizing system that synthesizes distortion-compensated signals that have been subjected to said distortion compensation and are then upsampled.

5. A distortion compensation method comprising:
   splitting an input signal into a plurality of split signals of a plurality of frequency bands;
   training said split signals based on a training signal included in downsampled split signals that have been downsampled after being split;
   compensating for distortions in each of said downsampled split signals based on a result of said training; and
   synthesizing distortion-compensated signals that have been subjected to said distortion compensation and are then upsampled.

* * * * *